Feb. 9, 1926.
L. G. KNAPP
SCALE
Filed Dec. 15, 1924
1,572,609
2 Sheets-Sheet 1
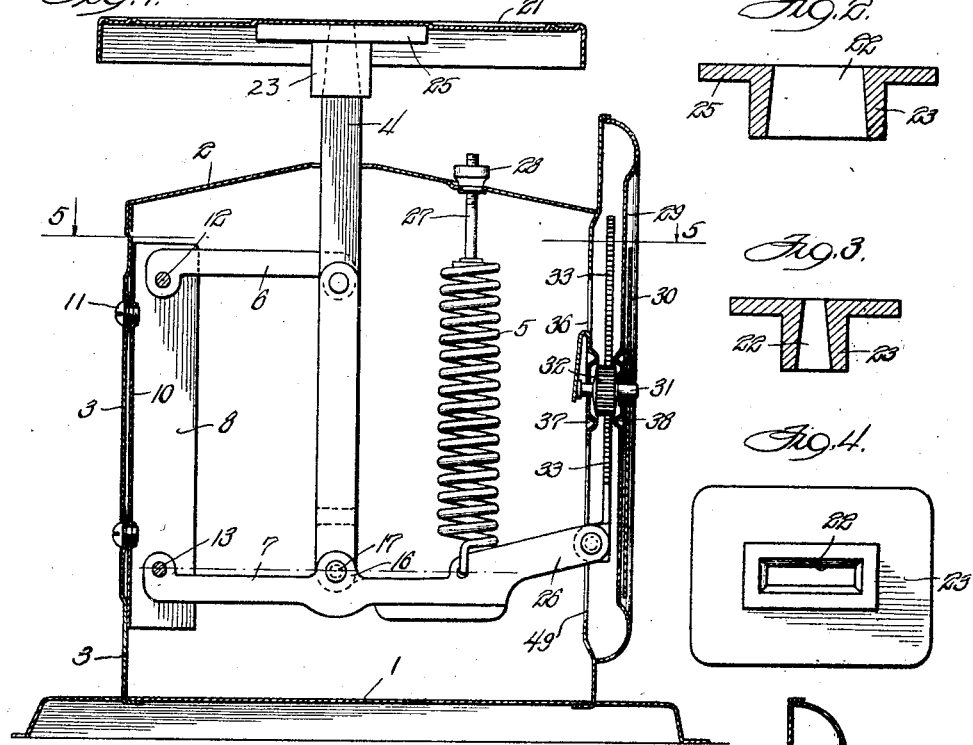
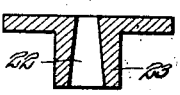
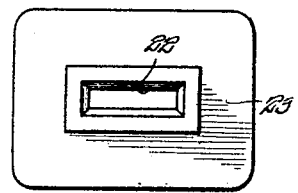
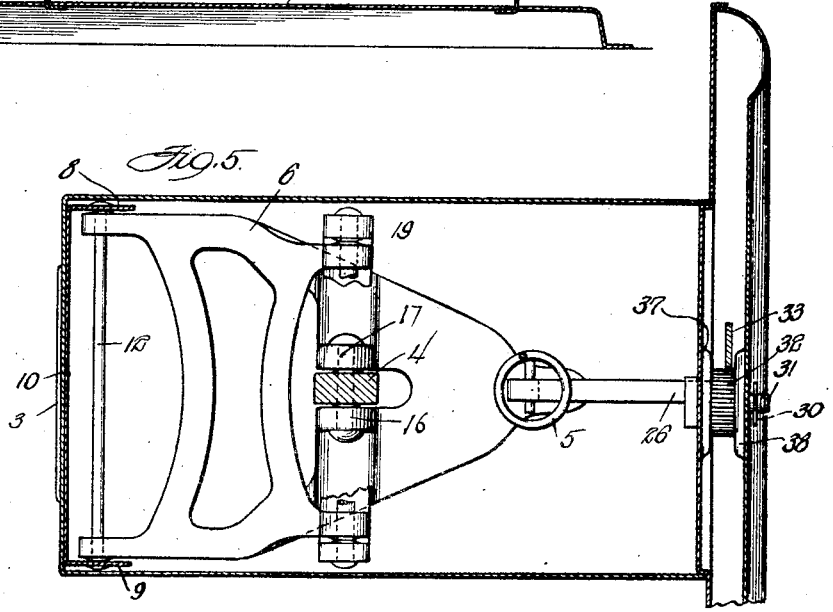
Inventor:
Leland G. Knapp Feb. 9, 1926.
L. G. KNAPP
SCALE
Filed Dec. 15, 1924
1,572,609
2 Sheets-Sheet 2
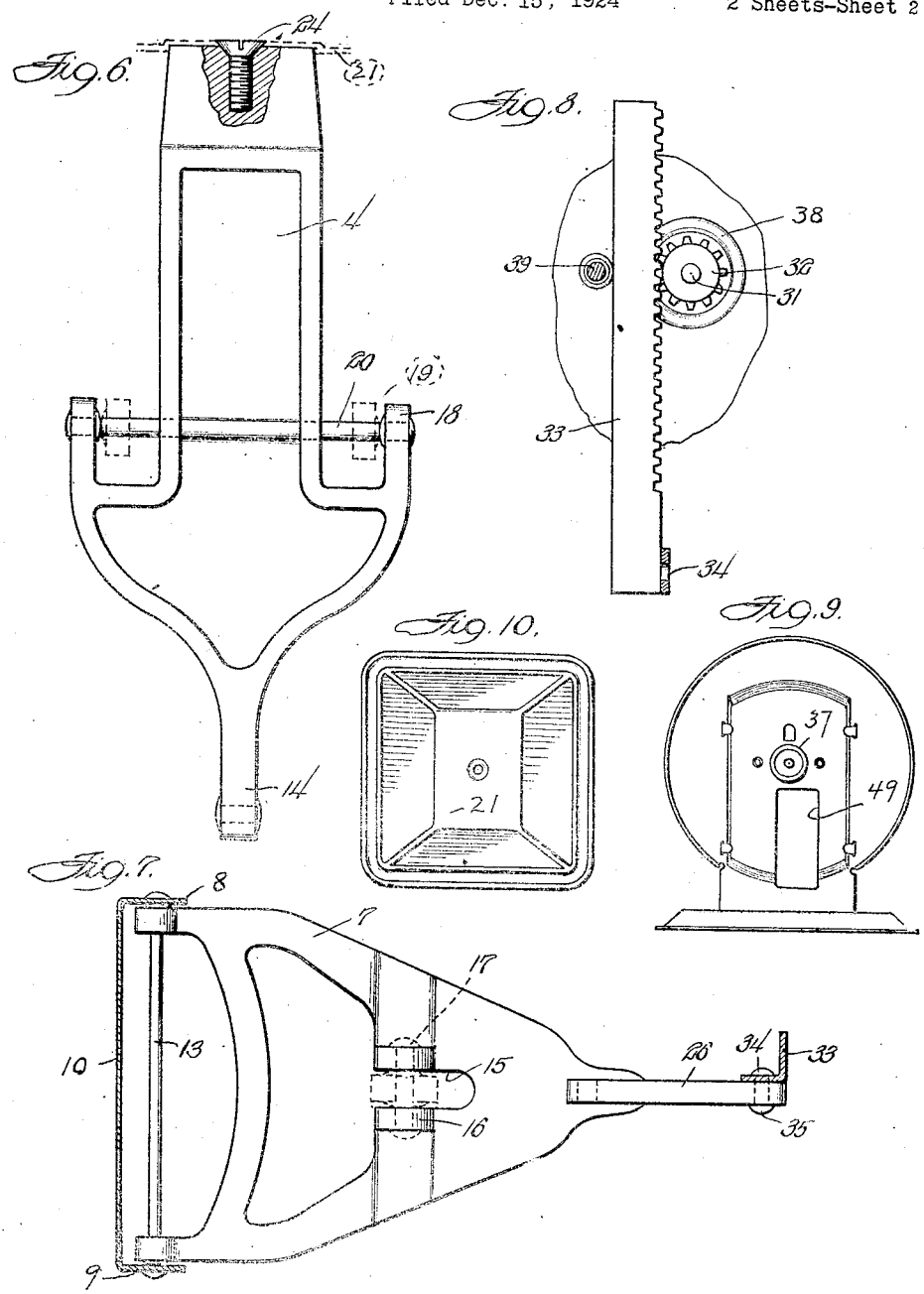
Inventor:
Leland G. Knapp Patented Feb. 9, 1926.

1,572,609

UNITED STATES PATENT OFFICE.

LELAND G. KNAPP, OF CHICAGO, ILLINOIS, ASSIGNOR TO MONTGOMERY, WARD & CO., OF CHICAGO, ILLINOIS, A CORPORATION OF ILLINOIS.

SCALE.

Application filed December 15, 1924. Serial No. 755,984.

*To all whom it may concern:*

Be it known that I, LELAND G. KNAPP, citizen of the United States, residing at Chicago, in the county of Cook and State of Illinois, have invented certain new and useful Improvements in a Scale; and I do hereby declare the following to be a full, clear, and exact description of the invention, such as will enable others skilled in the art to which it appertains to make and use the same.

My invention relates to weighing-scales of the general class in which an elevated platform is supported by a pair of levers affording a parallel motion and in which the weight is indicated by a pointer moved through a connection with one of the levers. Generally speaking, my invention aims to provide features of construction which will simplify the manufacture and assembling of such a scale and which will permit the avoiding of undesirable lost motion in a construction of unusually low cost.

Referring to some of its more particular objects, my invention provides novel means for connecting the platform-support to the supporting stem in a simple manner which will eliminate all rocking movement while avoiding extensive machine work. It also aims to provide a novel arrangement of the platform-supporting stem and of the parallel pivoting levers, whereby lost motion between these parts can be avoided without requiring accurate or extensive machining of the several parts.

In a further object, my invention provides a scale construction in which the platform-supporting stem, the parallel levers, the tension spring and the rack bar can all be operatively connected before the resulting assembly is inserted in the casing; provides simple means for securing this assembly to the casing; and also provides simple means for preventing an accidental loosening of the screws which secure the said assembly to the casing. Moreover, my invention provides a novel and exceedingly inexpensive rack bar construction which will permit the rack bar to be punched out of sheet metal, and also provides simple means for preventing such a thin rack bar from jamming between the pinion and adjacent wall portions. Still further and also more detailed objects will appear from the following specification and from the accompanying drawings, in which—

Fig. 1 is a central, vertical and longitudinal section through a scale embodying my invention.

Fig. 2 is an enlarged vertical section through the platform-support of the scale of Fig. 1 taken longitudinally of the scale.

Fig. 3 is a similar section taken at right angles to Fig. 1 and Fig. 2.

Fig. 4 is a plan view of this platform support, drawn on the same scale as Figs. 2 and 3.

Fig. 5 is a fragmentary horizontal section taken through the scale along the line 5—5 of Fig. 1.

Fig. 6 is an enlarged elevation of the stem which carries the platform, taken at right angles to Fig. 1, with a portion of the upper end in section.

Fig. 7 is a plan view of the lower link of the scale, also showing the pivoting connections of this link to the channel plate supporting it and to the rack bar.

Fig. 8 is an enlarged elevation of the rear bar and the pinion engaged by the latter.

Fig. 9 is a front elevation of the casing, showing this before the pinion and dial are attached and before the rack-bar is slipped into position.

Fig. 10 is a plan view of the platform of the scale.

In the illustrated embodiment, the scale of my invention includes a sheet metal base 1 supporting an upright casing of rectangular section which is closed at its top by a slip cover 2. Extending freely through a central opening in the cover 2 is a stem 4 which is supported by a tension spring 5 through a pair of parallel links 6 and 7. Each of these links has at its rear end a pair of arms spaced to correspond to the distance between the wings 8 and 9 of a channel plate, the latter being secured to the back 3 of the casing by screws 11 which extend through the back plate and which are threaded into the back 10 of the channel plate. To prevent a loosening of these screws through the jarring of the scale, I provide the back plate 3 with a portion offset rearwardly from the main part of the plate but shorter and narrower than the channel plate, so that the back 10 of the latter will engage the main portion 3 of the back of the casing flatwise, while the said raised or embossed portion will be spaced by some distance from the intervening part of the back 10 of the channel plate, after the manner shown in Figs. 1 and 5. When the screws 11 which extend through these spaced parts of the casing back and of the channel-plate back are tightened, they will flex the adjacent part of the casing back somewhat inwardly, thereby exerting a locking effect on the screw. For the pivotal connections between the wings 8 and 9 of the channel plate and the links 6 and 7, I am here showing shafts 12 and 13 respectively extending through the spaced pivot ears in these links and both extending through the said wings 8 and 9 of the channel plate. By disposing these wings 8 and 9 closely adjacent to the pivot ears on the two links, I prevent both lateral or twisting movement of these links with respect to the stationary channel plate and casing.

To prevent lost motion likewise between these links and the stem 4, I desirably employ the arrangement shown in Figs. 6 and 7. That is to say, I provide the stem 4 with a relatively thin lower end portion 14 fitting between the opposed walls of a crotch formation 15 in the lower link 7 and I provide this crotch formation with a pair of pivot ears 16, so that a rivet 17 extending through the ears 16 and the said stem end 14 will afford the pivotal connection, while the fitting of the said stem end between the pivot ears will prevent relative lateral motion. Then I provide the stem 4 intermediate of its ends with a pair of upwardly directed ears 18 spaced to correspond to the spacing between the oppositely directed faces of a pair of pivot ears 19 on the forward ends of the upper link 6. With the parts thus arranged and with the upper link pivoted to the stem by a shaft 20, which shaft extends loosely through a bore in the intervening part of the stem 4, the spreading of the connections between the stem and the upper link cooperates with the single central connection of the stem to the lower link in preventing any rocking or tilting movement of the stem 4 transversely of the scale. Hence I can readily secure a substantially rectilinear up-and-down movement of the stem 4 without lost motion, while employing an exceedingly simple construction.

To support the object to be weighed, I provide a platform, such as the one shown at 21 in Fig. 1, and I desirably secure this to the top of the stem 4 by simple means arranged for affording a firm connection without requiring machine work and without involving a liability to looseness or lost motion. For this purpose I preferably bevel the upper portion of the stem 4 from all four sides as shown in Figs. 1 and 6, so as to afford a substantially frusto-pyramidal upper end which will wedgingly fit into the correspondingly shaped bore 22 of a platform-supporting bushing 23. With the close fit thus secured, a single screw 24 threaded through a countersunk bore in the platform 21 suffices for securing the latter to the stem 4, while a widely spreading flange 25 on this platform support stiffens the platform. To prevent the platform from rotating about its said fastening to the stem, I desirably emboss its central portion upwardly as shown in Fig. 10 so as to fit the contour of the flange 23.

The weight of the link, stem and platform, together with that of any object supported by the platform is sustained in the usual manner by a tension spring 5 looped at its lower end through the forward arm 26 of the lower link and connected at its upper end to a threaded stem 27. Threaded on this stem 27 is an adjusting nut 28 which engages the top of the cover 2 and by means of which the spring 5 can be raised or lowered bodily so as to bring the indicating pointer of the scale to its zero position when there is no object on the platform.

To secure the weight indication, I provide the usual dial 29 at the front of the scale and have the weight shown by a pointer 30 secured to the shaft 31 of a pinion 32 which is engaged by a rack bar 33, the rack-bar being pivoted to the forward portion 26 of the lower lever. For the latter purpose, the rack-bar is desirably punched of sheet metal and has a pivot ear 34 integral with it and bent from its lower end and extending at right angles to the face of the rack-bar, or rearwardly of the scale so that it can be connected direct to the lower link by a pivoting rivet 35. By properly proportioning the size of this rivet and the bores through which it extends, I can readily secure a good pivotal connection without friction or appreciable lost motion, thereby getting the connection between the rack and the link system without a reduction in accuracy.

In practice, I have found that a rack-bar of relatively thin sheet metal will suffice for this purpose and will afford greater accuracy than could be secured by a cast bar without extensive machining on the latter. However, the use of a relatively thin rack-bar introduces the possibility that this might jam between either end of the pinion 32 and the two plates which confine the space in which the rack-bar moves, namely the front 36 of the casing and the dial plate 29. To guard against this, I provide at least one, and preferably both, of these plates with embossed formations disposed near the pinion and directed towards the other plate, such as the annular embossed formations 37 and 38 of Fig. 1. Such annular formations can readily be disposed fairly close to the pinion without interfering with an inexpensive assembling of the parts, and by having these formations extend toward each other so that the space between them is less than the thickness of the pinion at its periphery, I cause them to serve as guards or guides to prevent the rack-bar from engaging the main portions of the plates 36 and 29 and from jamming either behind or in front of the pinion. At the same time, I can readily guard against an undue swinging of the rack-back laterally away from the pinion by a relatively close disposing of one of the fastening screws 39 which fasten the dial plate to the casing front after the usual manner.

To permit the connecting of the rack bar to the lower link 26, I provide the front of the casing with a corresponding opening 49 and I desirably make this opening of such a size that the rack-bar can readily be inserted or withdrawn through it after the ear 34 on the rack-bar has been pivotally connected to the lower link. By doing this, I can assemble almost the entire mechanism of the scale before it is introduced into the casing, namely with the two links 6 and 7 pivoted to the channel-plate and the stem 4, with this stem extending through the cover, with the spring operatively interposed between the cover and the lower link, and with the rack-bar pivoted to the lower link. Then the parts as thus assembled can be slipped into position after they have been properly adjusted and can be secured in position by merely attaching of the two screws 11 and tightening the adjusting nut 28.

To reduce the friction between the two parallel links and the parts to which they are pivotally connected, I preferably provide the bearing portions with contiguous boss formations through which the pivoting axles extend, so as to afford contact surfaces of quite limited area. By so doing and by desirably also convexing these bosses, I prevent all tendency of the mechanism to stick and I reduce the friction so as to secure a high degree of sensitiveness in a relatively cheap scale construction.

However, while I have illustrated and described the various features of my invention in an embodiment including certain desirable shapes of different parts, I do not wish to be limited to the details of the construction and arrangement thus disclosed, it being obvious that many changes might be made in the construction and arrangement without departing either from the spirit of my invention or from the appended claims.

I claim as my invention:—

1. In a scale of the class described, a casing including a top provided with a perforation, a vertically disposed stem extending freely through the perforation, a pair of parallel links disposed one above another and each pivotally connected at its opposite ends respectively to the casing and the stem, the stem having its upper end tapered to a frusto-pyramidal shape, a flange having a shank provided with an upwardly tapering bore corresponding throughout its length to the frusto-pyramidal shape of the said stem end and having the said end socketed therein, the flange having its top enlarged to form a head larger than the said perforation, a platform seated on the said flange head, a screw extending through the platform into the said upper stem end to clamp the flange between the stem and the platform, and resilient means for resisting the movement transmitted to the stem by the load on the platform.

2. In a scale of the class described, a casing, a carrier plate within the casing and contiguous to a wall of the casing, a platform-supporting stem extending downwardly into the casing, a pair of parallel links pivotally connecting the carrier plate with the stem, resilient means for resisting movement transmitted to the links by a load on the platform on the supporting stem, and screws securing the carrier plate to the said casing wall; the said wall having a portion of considerable area (and including the parts through which the screws extend) offset from the remainder of the wall to afford a space between the said portion and the carrier plate and to permit the said portion to be flexed toward the latter when the screws are tightened, whereby the resiliency of the said wall will lock the screws against loosening.

3. In a scale of the class described, a casing, a platform-supporting stem extending downwardly into the casing, a pair of parallel links connecting the stem with the casing, weight-indicating means including a pinion journaled on an axis parallel to the links, a flat rack-bar engaging the pinion, the rack-bar having an end portion bent at right angles to its toothed portion, and pivoted to one of the links on an axis transverse of the axis of the pinion, the part of the last named link adjacent to the said pivotal connection to the end portion of the rack-bar having a surface disposed in flatwise engagement with the said rack-bar portion so as to prevent lateral movement of the rack-bar transverse of the axis of the pinion.

4. In a scale, a casing having a dial forwardly of and spaced from the front of the casing, there being an aperture in the said front, a rack-bar movable in the space between the dial and front; object-supporting mechanism including a member pivotally connected to the rack-bar and a spring interposed between the said member and the top of the casing, one of the thus pivotally connected members having a portion extending through the said aperture; indicating means including a pinion disposed in the said space and meshing with the rack-bar and a pointer fast on the pinion and disposed in front of the dial; and guide means in the said space for holding the major portion of the rack-bar away from the said front and dial.

5. A scale as per claim 4, in which the guide means comprise a formation formed on one of the members spaced by the said space and extending into the said space adjacent to the pinion.

6. A scale as per claim 4, in which the guide means comprise annular formations on the said dial and front extending towards each other concentric with and adjacent to the pinion.

7. In a scale, object-supporting mechanism including a lever and resilient means for resisting movement of the lever by the weight of the supported object, and indicating means including a hand connected to a pinion, and means operatively connecting the lever and pinion; the said means comprising a rack-bar punched from sheet metal and having its teeth meshed with the pinion and having a perforated end portion bent at right angles to its toothed portion and disposed in flatwise engagement with one end of the lever, and a pivot pin extending through the perforation in the said end portion and through one end of the said lever.

8. In a scale, a platform, a vertical stem supporting the platform and provided intermediate its length with a pair of widely spaced bearings, and having a lower end portion in a vertical plane medial of the said bearings, a casing; a pair of links for supporting the stem from the casing, the upper link having two pairs of laterally spaced ends respectively pivoted to the casing and to the said bearings, the lower link being of a substantially Y-shaped formation with the arms thereof pivoted to the casing at laterally spaced points and having at its crotch a pair of bearings disposed respectively at opposite sides of the lower end of the stem and pivoted conjointly to the latter and resilient means for resisting the movement transmitted through the stem by a load on the platform.

9. A scale as per claim 8, in which the widely spaced bearings on the stem and the link ends adjacent thereto are provided with convexed boss formations engaging each other to afford annular engaging surfaces of quite limited area.

10. A scale as per claim 8, in which the lower end of the stem and the bearings at the crotch of the lever have interengaging boss formations contacting with one another to afford annular engaging surfaces of quite limited area.

11. In a scale of the class described, a casing, a carrier plate having a main portion secured flatwise to a wall thereof and having a pair of parallel wings extending vertically from opposite edges of the said main portion; and object-supporting means including a vertical stem and a pair of parallel links connecting the stem with the carrier plate, each of the links having a pair of spaced ends provided with convexed bosses directed away from each other and respectively engaging the said wings and pivoted to the latter, whereby the said bosses afford contact surfaces of quite limited area engaging the said wings, and resilient means for resisting a movement of the stem by a load on the object supporting means.

Signed at Chicago, Illinois, December 12th, 1924.

LELAND G. KNAPP.